No. 867,601.  
PATENTED OCT. 8, 1907.  
M. RICE.  
PREPARING STALKS OF GRAIN FOR FORMING SHEAVES.  
APPLICATION FILED APR. 19, 1907.

Witnesses  
Harry L. Smith  
Hamilton D. Turner

Inventor  
Moses Rice  
by his Attorneys  
Smith & Frazier

UNITED STATES PATENT OFFICE.

MOSES RICE, OF PHILADELPHIA, PENNSYLVANIA.

PREPARING STALKS OF GRAIN FOR FORMING SHEAVES.

No. 867,601.   Specification of Letters Patent.   Patented Oct. 8, 1907.

Application filed April 19, 1907. Serial No. 369,102.

*To all whom it may concern:*

Be it known that I, MOSES RICE, a citizen of the United States, residing in Philadelphia, Pennsylvania, have invented certain Improvements in Preparing Stalks of Grain for Forming Sheaves, of which the following is a specification.

The object of my invention is to facilitate the leveling of the heads of stalks of grain preparatory to tying them up into sheaves.

Figure 1:
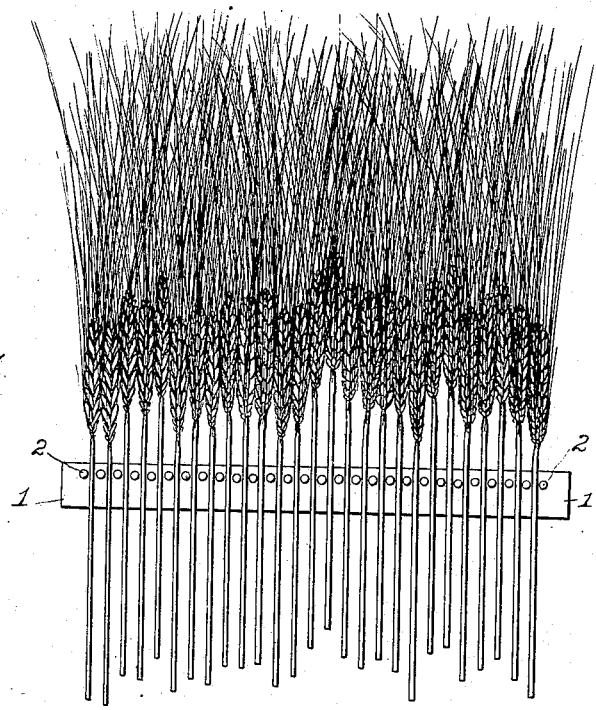
Figure 2:
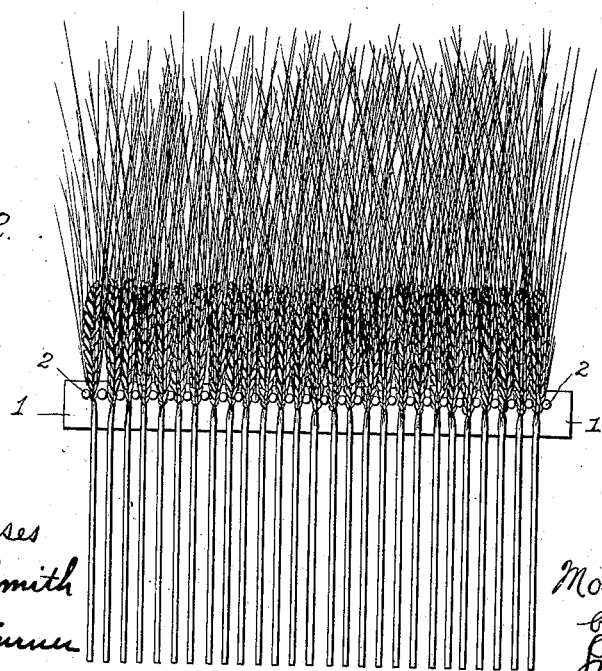

The accompanying drawing illustrates a device which may be used in carrying out my invention, Figure 1 showing the stalks of grain as originally applied, and Fig. 2 showing the same after they have been leveled.

In the preparation of floral designs it is customary to use, in some cases, sheaves of wheat or other grain, and, in accordance with the present method of grouping or bunching the stalks preparatory to binding them up into sheaves, the bundle of stalks is held in one hand and the individual stalks are then manipulated by the other hand so as to level the heads of the stalks. This operation as at present conducted is slow and inefficient, and the object of my invention is to materially expedite the operation and to render possible the production of perfect work. This object I attain by first separating and spreading out in a thin layer the various stalks of which the sheaf or bundle is to be composed, then pulling these stalks longitudinally and positively arresting the movement of the heads of the stalks when they reach a certain plane.

A simple form of device for use in carrying out my invention is that illustrated in the drawing and consists of a strip or bar 1 having projecting pins 2 properly and uniformly spaced thereon, each space being preferably of a size calculated to receive a single stalk of grain.

When the stalks are distributed over this plate with all of the heads on one side of the row of pins as shown in Fig. 1 said stalks are separated so that the quick and easy manipulation of the same can be effected, both hands being available for this purpose and the contact of the bases of the heads of grain with the pins arrests movement of the stalks and insures a true and uniform leveling of the heads of all of the bunch, as shown in Fig. 2, a result which, when the bunch of stalks is held in one hand as usual, cannot be attained without the exercise of care and corresponding consumption of time, hence the method of procedure which I have devised not only quickens the operation but insures a more acceptable product. After the heads of the stalks have been leveled in the manner described, said stalks are lifted together from between the pins and are then in proper condition to be tied into a sheaf.

I claim:—

The mode herein described of preparing stalks of grain for being tied into a sheaf, said mode consisting in first separating the stalks, and spreading them out in a thin layer so that they may be manipulated by both hands, then pulling upon the stalks in the direction of their length and positively arresting the movement of the heads of the stalks when they have reached a common plane.

In testimony whereof, I have signed my name to this specification, in the presence of two subscribing witnesses.

MOSES RICE.

Witnesses:
 HAMILTON D. TURNER,
 KATE A. BEADLE.